(12) United States Patent
Bouvier

(10) Patent No.: US 10,836,460 B2
(45) Date of Patent: Nov. 17, 2020

(54) PORTABLE SPILL VACUUM APPARATUS AND SKIMMING DEVICE

(71) Applicant: Wayne Lionel Bouvier, Chestermere (CA)

(72) Inventor: Wayne Lionel Bouvier, Chestermere (CA)

(*) Notice: Subject to any disclaimer, the term of this patent is extended or adjusted under 35 U.S.C. 154(b) by 34 days.

(21) Appl. No.: 16/341,180

(22) PCT Filed: Oct. 12, 2017

(86) PCT No.: PCT/CA2017/051211
§ 371 (c)(1),
(2) Date: Apr. 11, 2019

(87) PCT Pub. No.: WO2018/068140
PCT Pub. Date: Apr. 19, 2018

(65) Prior Publication Data
US 2020/0189694 A1    Jun. 18, 2020

Related U.S. Application Data

(60) Provisional application No. 62/407,036, filed on Oct. 12, 2016.

(30) Foreign Application Priority Data

Oct. 12, 2016  (CA) .................................. 2944917

(51) Int. Cl.
*E02B 15/04* (2006.01)
*B63B 35/32* (2006.01)
*E02B 15/10* (2006.01)

(52) U.S. Cl.
CPC ............ *B63B 35/32* (2013.01); *E02B 15/045* (2013.01); *E02B 15/048* (2013.01); *E02B 15/106* (2013.01)

(58) Field of Classification Search
CPC ...... E02B 15/04; E02B 15/045; E02B 15/048; E02B 15/106; B63B 35/32
USPC ......... 210/123, 136, 170.05, 170.09, 170.11, 210/242.3, 534, 747.6, 776, 923
See application file for complete search history.

(56) References Cited

U.S. PATENT DOCUMENTS 1,732,222 A * 10/1929 Cantrall ............. B01D 17/0214
                                                                210/123
1,756,869 A *  4/1930 MacLean ........... B01D 17/0214
                                                                210/123

(Continued)

*Primary Examiner* — Christopher Upton
(74) *Attorney, Agent, or Firm* — Antony C. Edwards

(57) ABSTRACT

A spill vacuum apparatus having a container having a cavity and a fluid inlet, the lower portion of the cavity including a fluid outlet closed by a check valve, the upper portion including a vacuum port and a fluid-level actuated release valve, the release valve cooperating with the upper portion to seal the cavity from the atmosphere until the release valve is actuated by a high fluid level reached within the lower portion by fluid volume, wherein coupling a vacuum source to the vacuum port depressurizes the cavity when the release and check valves are closed, and wherein when fluid is received in the lower portion through the inlet so as to reach the high fluid level, the release valve is actuated to unseal the cavity to the atmosphere, thereby releasing the weight of the fluid to actuate the check valve and release the fluid through the outlet.

19 Claims, 5 Drawing Sheets

(56) References Cited

U.S. PATENT DOCUMENTS

| | | | | |
|---|---|---|---|---|
| 3,847,815 | A | * | 11/1974 | Chastan-Bagnis .... E02B 15/048 210/242.3 |
| 3,875,062 | A | * | 4/1975 | Rafael .................... B63B 35/32 210/242.3 |
| 4,372,854 | A | * | 2/1983 | Szereday .............. E02B 15/106 210/242.3 |
| 4,521,312 | A | * | 6/1985 | Anderson .......... B01D 17/0214 210/123 |
| 5,108,591 | A | * | 4/1992 | Hagan .................. E02B 15/106 210/242.3 |
| 5,244,365 | A | * | 9/1993 | Catcher ................ E02B 15/106 210/242.3 |
| 5,948,266 | A | * | 9/1999 | Gore .................... E02B 15/048 210/242.3 |
| 7,368,054 | B2 | * | 5/2008 | Porter ................ B01D 21/0012 210/242.3 |
| 8,221,624 | B2 | * | 7/2012 | Dague .................. E02B 15/046 210/242.3 |

* cited by examiner

PORTABLE SPILL VACUUM APPARATUS AND SKIMMING DEVICE

RELATED APPLICATIONS

This application is a Patent Cooperation Treaty Application, which application claims priority to U.S. Provisional Patent Application No. 62/407,036 filed on Oct. 12, 2016 and Canadian Patent Application No. 2,944,917 filed on Oct. 12, 2016; the contents of both the above applications being incorporated herein by reference.

TECHNICAL FIELD

This disclosure relates to a spill vacuum apparatus for cleaning up spilled liquids, fluid, or mixtures from a body of water or the ground. In particular, this disclosure relates to a portable spill vacuum apparatus, which may be used in conjunction with a skimming device for skimming spilled hydrocarbons or other liquids that are lighter-than-water from the surface of a body of water.

BACKGROUND

In the oil and gas and mining industries, the infrastructure and operations for extracting natural resources from the earth, such as oil, gas, minerals and metals, often occur in very remote locations and/or near bodies of water. For example, pipelines buried underground may carry hydrocarbons or other natural resources from the remote location from which the resource was extracted to another location for further refinement or marketing. From time to time, accidental releases of hydrocarbons or other contaminated fluids from the pipelines into the surrounding environment may occur, contaminating the surrounding land and any bodies of water that are adjacent to the spill site. Other accidental releases of contaminants into the environment surrounding resource extraction sites may occur, for example, when a tailings pond or effluent containment unit, containing process chemicals harmful to the environment, is overfilled or otherwise springs a leak. When such accidental releases occur, it is important to commence cleanup operations as soon as possible, as natural processes, such as wind, rain and water currents, may quickly disperse the contaminants over a larger area of the environment, thereby making the efforts to clean up the spill and remove the contaminants from the environment increasingly difficult.

As such accidental releases of contaminants into the environment often occur in very remote locations, it can be difficult to quickly deploy the equipment typically required for cleaning up such spills. For example, in the case of an accidental release of thousands of liters of hydrocarbons from a pipeline in a remote location, the released hydrocarbons may quickly disperse into nearby bodies of water and/or underground water sources, in a matter of minutes or a few hours. Typically, such spills require vacuum or pumping equipment capable of quickly suctioning, and storing, large volumes of fluids that may include the spilled hydrocarbons or other spilled contaminants, plus the water that has mixed with the contaminants. For example, the most common equipment for cleaning up such spills includes vacuum trucks fitted with a large capacity tank and a vacuum source or vacuum generator, which equipment is used to collect the contaminant fluids and store the suctioned fluids on the truck. Once the truck's storage tank is full, the truck must drive to a treatment facility or disposal site for treating or disposing the contaminated fluids. If there remain contaminants at the spill site to be removed, the cleanup operations are either put on hold or an additional truck (or trucks) must be provided to continue the cleanup while the first truck transports and empties its load of contaminants.

However, if the spill occurs at a remote site that may be hundreds of kilometers from the nearest municipality, it is often impractical to have one or more large capacity vacuum trucks close to the site on standby in case of a spill, as such equipment is typically expensive and it may be cost prohibitive to keep such equipment on standby. Thus, there may be a delay of several hours or days before such vacuum trucks can reach a remote spill site for cleanup operations to commence. If the volume of contaminants exceeds the capacity of the tank on the vacuum truck, there may be even more delays as multiple trucks are located and then moved to the remote spill site, and in addition if the trucks must offload the contaminants at a facility far from the spill site, there may be additional delays in waiting for the trucks to offload and then return to the spill site. The difficulty in deploying vacuum equipment is further heightened for remote locations that may only be accessible by water or air.

To help address the issue of the limited availability of expensive, specialized vacuum trucks at remote spill sites, there are also miniature vacuum tank systems that may be mounted to a tractor or a trailer hitched to an all-terrain vehicle (ATV). Such systems are smaller, less expensive and thereby may be made more readily available near remote locations, as compared to large tanker trucks with vacuum equipment. In addition, such miniature vacuum tank systems are smaller in size and therefore easier to transport over rough terrain, such as by using a tractor or ATV. However, the difficulty with relying on such systems is that because the capacity of the miniature tanks is necessarily small enough that the tank may be mounted to tractors or ATVs, they fill quickly and still need to be emptied before they can be put back into service for cleaning up the spill, thereby still requiring downtime to transport the full tanks to an appropriate site for storage or treatment, which again may introduce significant delays in the cleanup operations.

In addition to the need for a less expensive and widely available vacuum equipment for removing contaminants from a spill site, there is also a need for containing such spills on a surface of a body of water so as to more efficiently remove such contaminants from the body of water. For an example, when an accidental release of hydrocarbons into a body of water occurs, an inlet hose of a spill vacuum may be directed to the surface of the water where the largest concentration of hydrocarbons is observed and remove volumes of the contaminated hydrocarbon/water mixture from the surface. However, this method is rather inefficient as the suction hose necessarily picks up a large volume of water along with the hydrocarbon contaminants, thereby quickly filling up the storage tank of the vacuum equipment with a large volume of water along with a relatively small volume of contaminants, which contaminated water must then be transported off-site for further cleaning and processing or storage before the water may be returned to the environment.

Thus, skimming devices may be deployed in a contaminated body of water to gather the lighter-than-water contaminants and partially separate those contaminants from the larger volume of water, such that the contaminants may then be removed with a spill pump. For example, such a skimming device is disclosed in U.S. Pat. No. 5,141,632 issued to Catcher (the '632 patent), which device includes floats made of foam, the device measuring approximately 25 feet in diameter, with a series of intake slots radially spaced along an inner surface of the float, where hydrocarbons may be partially separated from the surrounding water, and a tubular conduit connected to a spill pump through an intake opening in the skimmer device which removes the concentrated hydrocarbons while leaving most of the uncontaminated water behind. However, the issue with such skimming devices as taught in the '632 patent is that such devices are large and not very portable (for example, a device that is 25 feet in diameter may not be carried on a tractor or ATV, or even a regular pickup truck), thereby making it difficult to deploy such devices quickly and easily in remote areas where a water spill has occurred. For example, the skimming device taught in the '632 patent is adapted for use in conjunction with a large pumping unit utilizing pistons that is described as being supported on a dock or on a ship, and the storage means includes large tanks or receptacles supported on the ship.

In another patent of which the applicant is aware, U.S. Pat. No. 4,428,319 issued to Henning et al (the '319 patent), there is taught a skimming device described as shaped like an empty sock, with an aluminum frame supporting an open end of the skimmer, and a combination of floats constructed of air pockets and foam to provide buoyancy. The skimmer taught in the '319 patent is designed so as to ensure there is no air between the oil collected within the skimmer and the top of the skimmer, to make it easier to remove the collected oil from the skimmer by a pump. However, the skimmer disclosed and claimed in the '319 patent requires an aluminum frame so as to keep open the one end of the skimmer, and further includes a deployment apparatus involving a cable for deploying the skimming device in the water. Furthermore, the inclusion of foam floats along with the frame and deployment apparatus, as taught in the '319 patent, makes it more difficult to compactly store and transport this skimming device on small vehicles in remote locations, and the need for deployment apparatus further complicates deploying the skimming device from positions other than on a large ship with a ramp (for example, deployment from a shore or from a small water craft that does not have a ramp or crane). Thus, there is a need for an effective skimming device that is relatively inexpensive, portable, and easily deployed in remote locations where a spill has occurred.

SUMMARY

In one aspect of the present disclosure a portable vacuum spill apparatus is described. The vacuum spill apparatus includes a sealable, water-tight canister or other suitable containment means, for example, a container, tank or vessel (herein collectively referred to as a container). The container has a fluid inlet into a cavity of the container, the cavity having upper and lower portions, the upper portion of the cavity in fluid communication with a fluid-level actuated release valve for sealing the cavity from a surrounding atmosphere, the lower portion of the cavity in fluid communication with a fluid outlet, and a vacuum port formed on or mounted to the container and in fluid communication with the cavity of the container. In some embodiments, a float may be translatably mounted within the cavity and may be coupled to the release valve, such that the float actuates the release valve so as to unseal the container to the atmosphere, when the fluid level inside the cavity reaches the high fluid level. However, this is not intended to be limiting, and there may be other mechanisms for actuating the release valve based on the level of fluid inside the cavity which are intended to be included in the present disclosure. For example, not intended to be limiting, a sensor such as an optical or water-content sensor mounted within the cavity, cooperating with an electronic controller for actuating the release valve when the sensor detects the fluid has reached the high water level, may be utilized to provide for actuation of the release valve.

In use, the container is de-pressurized through the vacuum port by connecting it to a vacuum source or vacuum generator. In a preferred embodiment the vacuum port is above a high water point, otherwise referred to herein as a high fluid level, within the cavity of the container. The fluid outlet may be biased closed by a check valve. The check valve on the fluid outlet remains closed until the container's cavity is filled with a set volume of fluid, such as the set volume of fluid required for the fluid to reach the high fluid level within the lower portion of the cavity of the container, at which point the force of the buoyancy of the float actuates the release valve thereby opening or unsealing the cavity of the container to the atmosphere and releasing the weight of the set volume of fluid within the cavity to actuate the check valve of the fluid outlet, releasing the fluid in the cavity through the fluid outlet. Once the set volume of fluid is released from the cavity, the release valve resets to a closed position, and the check valve resets so as to close the fluid outlet, thereby sealing the cavity from the surrounding atmosphere. In this manner, the fill-and-drain functioning of the spill vacuum apparatus continues in a cyclical fashion, allowing fluid to be moved, for example, from a body of water to a fluid receptacle, on a continuous basis while the vacuum source or vacuum generator is coupled to the vacuum port.

The check valve positioned at the bottom of the container opens and releases the fluid held within the cavity of the container through the fluid outlet. The biasing of the check valve may include a weight on the check valve flap which causes the flap to close after fluid has been released, or springs, or any other suitable biasing structures known to a person skilled in the art. The release valve closes as the float lowers during the outflow of the fluid from the cavity of the container, thereby re-sealing the container from the atmosphere and allowing the container to again become pressurized through the vacuum port as the fill-and-drain cycle repeats. The vacuum spill apparatus may thus cyclically suction contaminated water or other fluids from the environment into the container and dump the contents for removal from the site.

In another aspect of the present disclosure, a portable skimming device is provided having a body with an upper portion and a lower portion, and adapted to float in water. The portable skimming device includes one or more floats which enable the skimming device to be buoyant in water. Preferably, the floats include closed channels which may be inflated with air. The upper portion is coupled to the lower portion along the perimeter of the device forming a cavity, with one side remaining substantially open so as to form a mouth into the cavity into which contaminated water may flow. In some embodiments, an upper lip of the mouth may be tethered to the lower lip of the mouth with one or more straps connecting the upper portion to the lower portion while leaving the mouth substantially open to receive flowing water. On the upper portion of the skimming device, there may be a pipe fitting and check valve extending through the upper portion, thereby providing a fluid connection between a suction hose of the vacuum spill apparatus and the interior collection volume of the skimming device through which fluids, such as contaminated water and air, may flow. The interior collection volume, located opposite the mouth within the skimming device, is where contaminants are gathered from the flowing water. One or more inlet air tubes may extend outwardly from either corner, or both corners, of the mouth of the skimming device, the air inlet tubes being in fluid communication with the one or more inflatable air channels that run along the closed portion of the perimeter of the skimming device.

Optionally, one or more air channels may also extend from the perimeter air channels into the middle of the upper portion of the skimming device, thereby providing additional flotation support for the device when it is placed in water. Because the device relies only on inflatable air channels to provide buoyancy for the device in water, the device may be easily folded into a small package for storage until it is ready to be used.

The skimming device may be deployed in a body of water by simply attaching an air supply to one or both of the air channel inlets so as to inflate the one or more air channels of the device; the device may then be placed on a water surface and tethered to either a boat, a dock, a vehicle on land adjacent the body of water, or any other suitable tethering point, preferably using at least two tethers attached to either side of the mouth of the device, and allowed to freely float in the water so as to allow the device to orient itself in the direction of the water flow, with the mouth facing the direction of the flow so as to enable the water to flow through the mouth and into the cavity of the skimming device.

As air and contaminated water flows into the mouth of the device, the lighter-than-water contaminants floating to the surface of water flows into the device and travels towards the nose or collection portion of the device. The water flowing within the cavity of the device tends to flow in a substantially laminar manner as opposed to a turbulent manner, the laminar flow allowing the water to become more calm and the lighter-than-water contaminants to float to the surface of the water. As the lighter-than-water contaminants on the surface of the water flows towards and becomes trapped within the nose section of the skimming device, the heavier, uncontaminated water underneath the contaminants exits the device through a series of longitudinal slits in the lower portion of the device. Thus, the water trapped within the device's cavity becomes much more concentrated with contaminants as the cleaner, heavier water flows out of the slits in the lower portion of the device while lighter-than-water contaminants remain on the surface of the water and become trapped against the interior surface of the nose section of the device.

A suction hose may be fitted to the hose coupling and check valve coupled to a pipe extending through the upper portion of the device towards the cavity of the device, thereby providing a fluid path through which the lighter-than-water contaminants may be suctioned out of the nose of the device and into a storage container, such as by using the vacuum spill apparatus described above, or any other suitable vacuum apparatus, to suction the fluid contaminants and store them in temporary storage containers described below.

In another aspect of the present disclosure, a kit may be provided including a portable vacuum spill apparatus, one or more temporary storage containers or receptacles which may be quickly coupled to or positioned underneath the fluid outlet of container for collecting fluid flowing from the fluid outlet of the pump, and one or more skimming devices. The temporary storage containers or receptacles may include bags constructed of a strong polyvinyl material, which material defines a cavity and an opening into the cavity, and further including at least one or two handles, hooks, loops or other suitable structures that may be coupled to hooks or latches located on the exterior surface on the container and proximate to the fluid outlet, so that the temporary storage container may be held in an open position underneath the vacuum spill apparatus during filling of the storage container, and once the storage container reaches capacity, the loops or handles may be simply released from the vacuum spill apparatus's hooks and the storage container moved to a new location, while another temporary storage container may be positioned underneath the vacuum spill apparatus's fluid outlet. The opening to the cavity of the storage container may optionally include an elongate tubular member, in which the opening of the tubular member is either clamped to the fluid outlet of the vacuum spill apparatus container or otherwise held in an open position underneath the fluid outlet, while the storage container is being filled, and then once the storage container is full of pumped fluid, the elongate tubular member may be readily removed, clamped closed, and placed over top of the filled storage container until the storage container is ready for transport at a later time. Once clamped closed, the storage containers may be placed on land or in a body of water for temporary storage of the contaminated fluids until they can be removed and transported for further processing.

DETAILED DESCRIPTION

Figure 1:
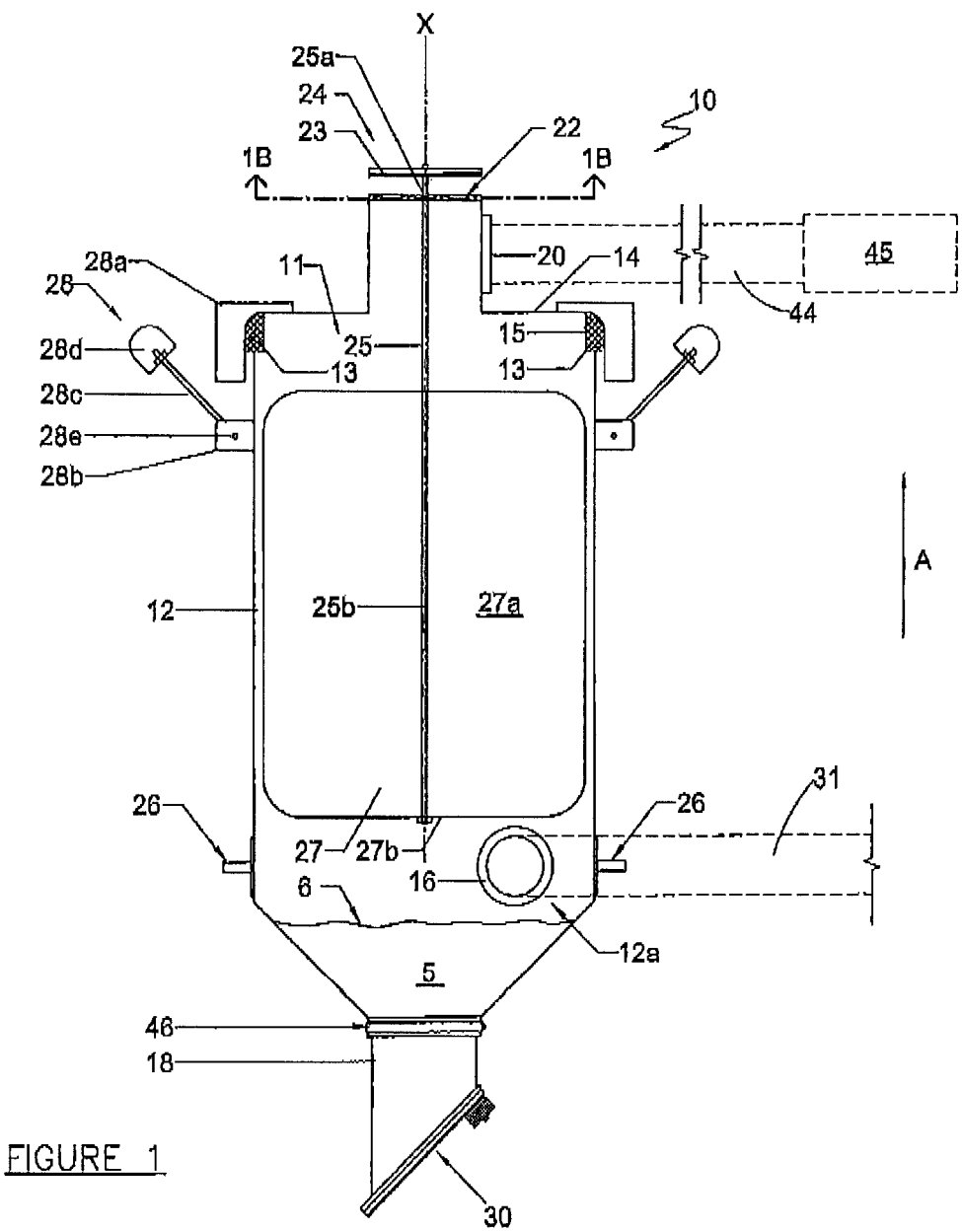
FIG. 1 is a partially cut away, front elevation view of an embodiment of a vacuum spill apparatus.
Figure 1A:
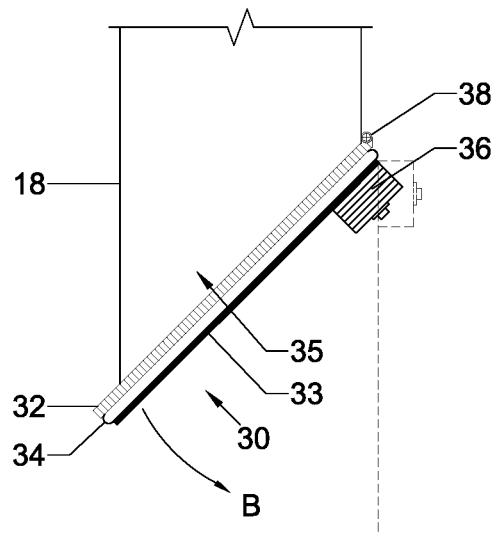
FIG. 1A is a close-up view of the vertical check valve of the vacuum spill apparatus shown in FIG. 1.

An embodiment of a vacuum spill apparatus will now be described with reference to FIGS. 1, 1A and 1B. A portable vacuum spill apparatus 10 includes a sealable container 12 having an opening 11, cover 14, a fluid inlet coupling 16, fluid outlet 18, a vacuum line coupling or vacuum port 20, an air vent 22 and a release valve assembly 24. In some embodiments a cover 14 is secured over the opening 11 of container 12 by fastening means 28, which for example may include a latch down plate 28a, a hinge plate 28b, a lock bolt 28c and a lock bolt nut 28d whereby the lock bolt 28c is pivotably coupled to the hinge plate 28b about a pivot coupling 28e and the lock bolt knot 28d may be secured over the latch down plate 28a when it is desired to secure the cover 14 so as to seal the opening 11 of container 12. The cover 14 may be removed when required to access the cavity 12a of container 12, for example in order to remove sticks, stones or other debris that may have been introduced to cavity 12a through inlet coupling 16. There may be a groove 15 running around the circumference of the cover 14, with a gasket 13 seated within the groove 15 and thereby providing a substantially airtight seal for the container 12 when the cover 14 is secured to the container 12 by the fastening means 28. Similarly, the vacuum line coupling or vacuum port 20 and the inlet coupling 16 are preferably substantially airtight couplings so as to prevent or reduce ingress of air into the container 12 during operation of the vacuum spill apparatus 10. Attachment members, such as hooks 26, 26 may be mounted to the exterior surface of the container 12 proximate to the fluid outlet 18 so as to support a storage container (not shown) beneath and adjacent to the fluid outlet 18. The fluid outlet 18 is selectively sealed by a check valve 30, seen in enlarged view in FIG. 1A.

In operation, container 12 is sealed with the cover 14 by the fastening means 28. Air within the cavity 12a is substantially evacuated through the vacuum line 44. A fluid suction hose 31 is attached to the fluid inlet coupling 16. Fluid outlet 18 is located at the bottom of container 12 and has an outlet flange 32. Outlet flange 32 preferably is formed at an angle $\alpha$ of, for example, substantially 45° relative to the ground. The opening 35 of outlet 18 is sealed by a vertical check valve 30 which includes a check valve flap 33 and a gasket 34 sandwiched between a flange 32 of outlet 18 and the flap 33 when the check valve 30 is in a closed position. Flap 33 is pivotally coupled to the flange 32 or outlet 18 by a hinge 38. The check valve 30 may include one or more weights 36 so as to enable the flap 33 to close due to the force of gravity acting on the flap 33 and weights 36. Flap 33 closes after the fluid within container 12 has exited through outlet 18. Optionally, the flap 33 may be constructed of such dimensions and materials so as to provide sufficient weight to close the flap 33 after the fluid has exited without the use of separate weights 36, or may include springs other biasing means, known to a person skilled in the art so that flap 33 closes after the fluid has exited.

Figure 1B:
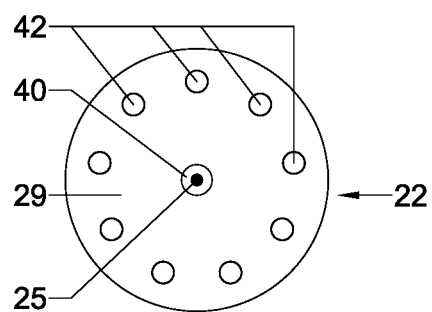
FIG. 1B is a cross-section taken along line 1B-1B of the vacuum spill apparatus illustrated in FIG. 1.

As best seen in FIG. 1B, the release valve assembly 24 includes a release valve disc 23 coupled to a threaded rod 25 at a first end of the rod 25a, with the second end of the rod 25b secured to a float 27. The float 27 may be constructed of Styrofoam™, aluminum, plastic, or any other suitable buoyant material known to a person skilled in the art that is buoyant when in a water or aqueous solution mixture. Because some buoyant materials, such as Styrofoam™, are relatively soft and susceptible to impact damage from sticks, stones or other debris that may be suctioned into the cavity 12a, the float 27 may be advantageously constructed of Styrofoam™ encased in fiberglass, for example, so as to reinforce the exterior surface 27a of float 27 and protect the float from impact damage. The air vent 22, as best seen in FIG. 1B, comprises a surface 29, a rod aperture 40 through which the rod 25 is journaled, and a plurality of ventilation apertures 42.

In operation, any device capable of creating a vacuum may be coupled via a vacuum line to the vacuum line coupling 20. For example, the applicant successfully utilized a vacuum pump, model 151 supplied by Wallenstein™, driven by a Honda™ gas-powered engine, model GX 160, as the vacuum source 45 for the vacuum spill apparatus 10. These off-the-shelf components are relatively compact and may be easily transported on a regular pickup truck or a smaller vehicle, such as an ATV or a tractor. However, the examples of components above are provided for illustrative purposes only and are not intended to be limiting, and it will be recognized by a person skilled in the art that other vacuum pumps or vacuum generators, and other motor components to drive the vacuum pumps or generators, including and not limited to electric and diesel powered motors, and other components that provide a suitable vacuum source for the vacuum spill apparatus 10 described herein come within the scope of the present disclosure.

In use, a vacuum source 45 is coupled to the vacuum line coupling 20 via a vacuum line 44. The vacuum source 45 suctions air, contaminated water or other liquids or fluids, and other matter through the vacuum line 44. When the vacuum source 45 supplies a vacuum to vacuum line 44 and fluid has not yet entered the cavity 12a, the check valve 30 is in a closed position. Check valve 30 remains in a closed position as fluid enters the container 12 through fluid inlet coupling 16. As the volume of fluid within the container 12 increases, the upper surface 6 of the fluid 5 within the canister or container 12 rises, eventually coming into contact with the lower surface 27b of float 27. Eventually, a sufficient volume of fluid will enter the container 12 such that the fluid surface 6 engages the bottom surface 27b of the float 27, pushing float 27, rod 25 and release valve assembly 24 in direction A along axis X. Within assembly 24, release valve disc 23 is attached to the rod 25 so as to be positioned above vent 22. When assembly 24 is elevated in direction A, allowing air to flow into the cavity 12a through the open air vents 22, the flap 33 and gasket 34 of check valve 30 swing away from the flange 32 of the outlet in direction B into an open position, illustrated in dotted outline in FIG. 1A. Upon opening the check valve 30, fluid within the container is released downwardly through the outlet 18.

Although a float is utilized in the embodiment described herein to actuate the release valve when the high fluid level is reached within the cavity of the container, it will be appreciated that other mechanisms as known to a person skilled in the art, for actuating the release valve based on a volume of fluid, or set volume of fluid, reaching a high water level within the cavity, are also intended to be included in the present disclosure. Such mechanisms may, for example, include one or more sensors for detecting a level of fluid within the cavity, the one or more sensors cooperating with an electronic controller or other mechanism to unseal the release valve when a high fluid level within the cavity of the container is detected by the sensor.

Preferably, a temporary storage container may be situated below and adjacent to the outlet 18 to capture the outflow. In other embodiments (not shown), a flange may be coupled around the perimeter of the outlet neck 46, providing a stable base for the vacuum spill apparatus 10 to be positioned against an upper surface of a tank, container or receptacle having an inlet for receiving the outflow from outlet 18, and which flange also supports half of the hinge 38 for the flap 33, whereby the half of the hinge 38 is mounted to the flange.

The total surface area of the ventilation apertures 42 may be preferably calibrated so as to ensure that the buoyant force acting on the float 27 is sufficient to overcome the suction of the vacuum and thereby open the air vent 22 to the atmosphere, so as to break the vacuum and release the fluids in container 12 before the surface 6 of fluids 5 in the cavity 12a reaches the vacuum line coupling 20, so as to prevent flooding of the vacuum line 44. Without committing to any particular theory of operation, applicant has found that decreasing the total surface area of the ventilation apertures 42 tends to reduce the amount of buoyant force acting on float 27 required to actuate the release valve assembly 24 and open the air vent 22 to the atmosphere.

Once the fluid 5 has evacuated from the container 12, float 27 and attached release valve disc 23 are pulled down by the force of gravity, once again seating the disc 23 against the air vent 22 of the container 12 and substantially sealing the cavity 12a from the atmosphere. Additionally, the force of gravity acts on weight 36 secured to the vertical check valve flap 33, causing the check valve 30 to swing closed in a direction opposite to direction B about its hinge 38, once again seating the gasket 34 of the flap 33 against the flange 32 of the outlet 18. With the air vent 22 and fluid outlet 18 once again sealed against the outer atmosphere, any air in the cavity 12*a* is evacuated through the vacuum line coupling 20 and fluid is again suctioned into the container 12 through suction hose 31 and inlet coupling 16, so as to repeat the fill-and-drain cycle.

Advantageously, as stated above, the vacuum spill apparatus 10 may be constructed to a scale to be readily lifted by one or several workers so as to be portable and transportable by smaller land vehicles, watercraft or aircraft, including for example an all-terrain vehicle (ATV), a tractor, a small motor or paddle boat, a small helicopter or any other suitable means of transportation that may be required for moving the vacuum spill apparatus 10 to a remote location. For example, not intended to be limiting in any way, vacuum spill apparatus 10 may weigh no more than 25 lbs and container 12 may be substantially cylindrical in shape and approximately 32 inches in height having a diameter of substantially twelve inches. A corresponding cover 14 may have a diameter of substantially 13 inches. A vacuum spill apparatus of this size, along with its vacuum source 45, may be readily transported on a vehicle as small as a typical ATV or small boat. However, the dimensions and weights provided above are not intended to be limiting, and it will be appreciated by a person skilled in the art that a vacuum spill apparatus as disclosed herein may be scalable for a particular application requiring the removal of fluids or slurry from a given environment. It will further be appreciated by a person skilled in the art that the cylindrical shape of the container 12 disclosed herein is not intended to be limiting and that other container geometries and other arrangements of the inlet and outlet ports will also work and be suitable for the vacuum spill apparatus described herein.

Temporary storage containers or fluid receptacles, for example, receptacles comprising large polyvinyl bags, may be relatively easily stored and transported for collecting large volumes of fluid during a spill cleanup operation. Such large capacity bags may be folded for relatively compact transportation. Because the vacuum spill apparatus 10 described herein is relatively inexpensive to manufacture and transport, as compared to a dedicated vacuum truck or a plurality of miniature storage tanks, vacuum spill apparatus 10 may be widely deployed and made available at or near many remote locations where a spill may occur. For example, such vacuum spill apparatus 10 could be widely distributed to all oil field and mining operations that are in remote locations and thereby made readily available whenever a spill occurs at those remote locations. Furthermore, individual workers travelling between remote work locations in, for example, standard-sized pickup trucks or similar vehicles may easily store one or more vacuum spill apparatus 10 on their trucks, thereby making a greater plurality of vacuum spill apparatuses readily available near areas where spills might occur in remote areas. The applicant believes that the wide deployment of such vacuum spill apparatus apparatuses, made practical due to their relatively compact size and inexpensive manufacturing costs, will greatly increase the ability of workers to quickly respond to spills, even when spills occur in remote locations.

A skimming device in accordance with the present disclosure, which may be used in conjunction with the vacuum spill apparatus 10 or with any other conventional vacuum spill apparatus, will now be described with particular reference to FIGS. 2 through 5. A skimming device 15 comprises an upper portion 51, a lower portion 52 and one or more float members 54. In a preferred embodiment, the skimming device 50 may be constructed of a fabric or a supple, fabric-like material, such as for example a reinforced polyvinyl canvas or polyvinyl sheet. The inflatable float members 54 of the skimming device are ideally constructed of materials that are, or which can be made, substantially air-tight, so as to maintain the buoyancy of the device when the floats are inflated with air. For example, alternative materials for constructing the portable skimming device 50 may include vinyl, rubber, tarpaulins, Nylon™ or any combination of these or similar materials, or any other suitable material for the application known to a person skilled in the art. The upper portion 51 and lower portion 52 may be coupled together, for example by stitching means, an adhesive, or any other means that would be suitable and known to a person skilled in the art, along the side edges 61, 61 and the nose edge 62. The upper and lower portions 51, 52 are not necessarily separate pieces, and may for example be comprised of a single piece or section of material. The lips 63*a*, 63*b* of the upper portion 51 and the lower portion 52, respectively, are not coupled together, thereby creating an opening or mouth 56 extending substantially along the length of the lips 63*a*, 63*b*.

Figure 2:
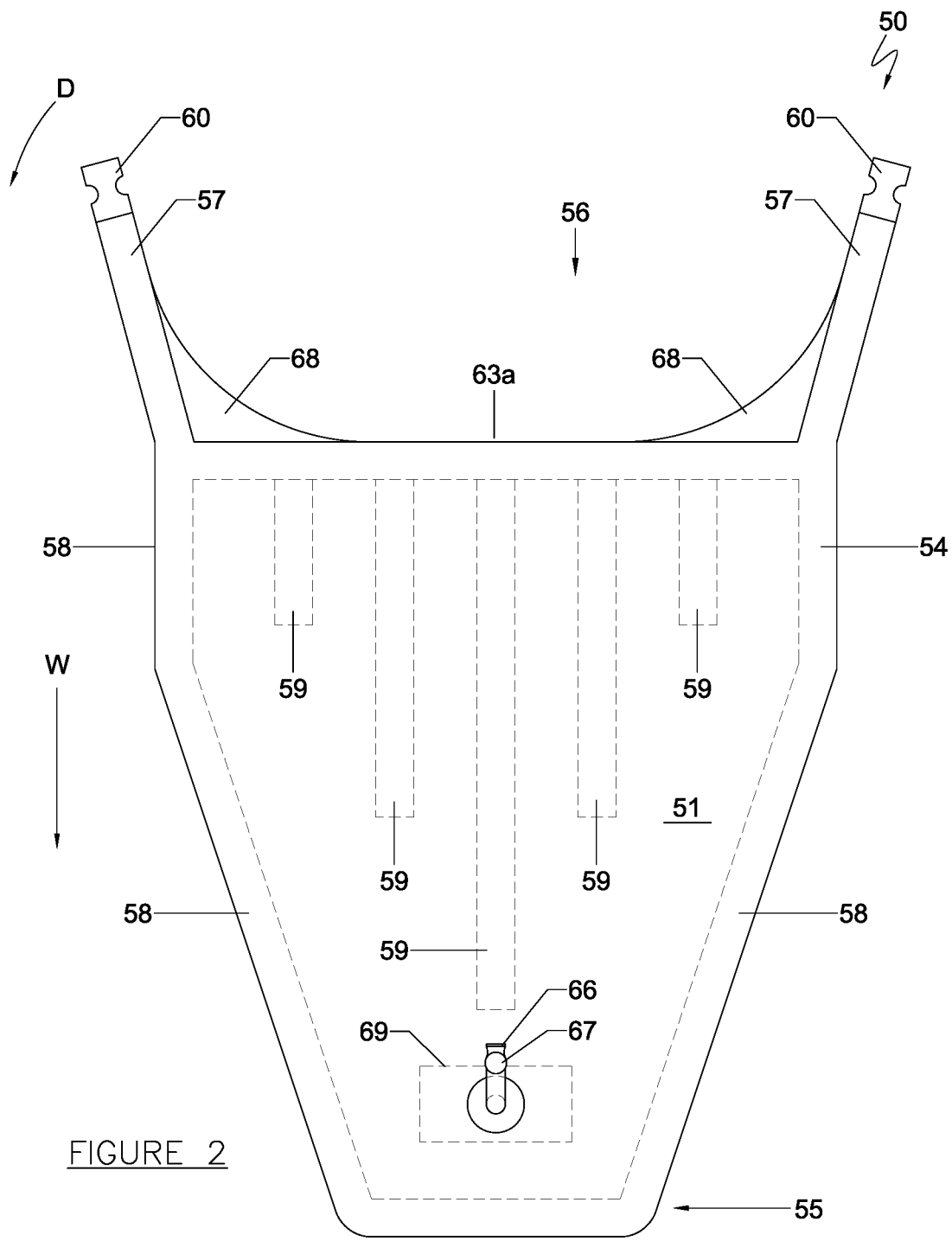
FIG. 2 is a top elevation view of an embodiment of the skimming device.
Figure 3:
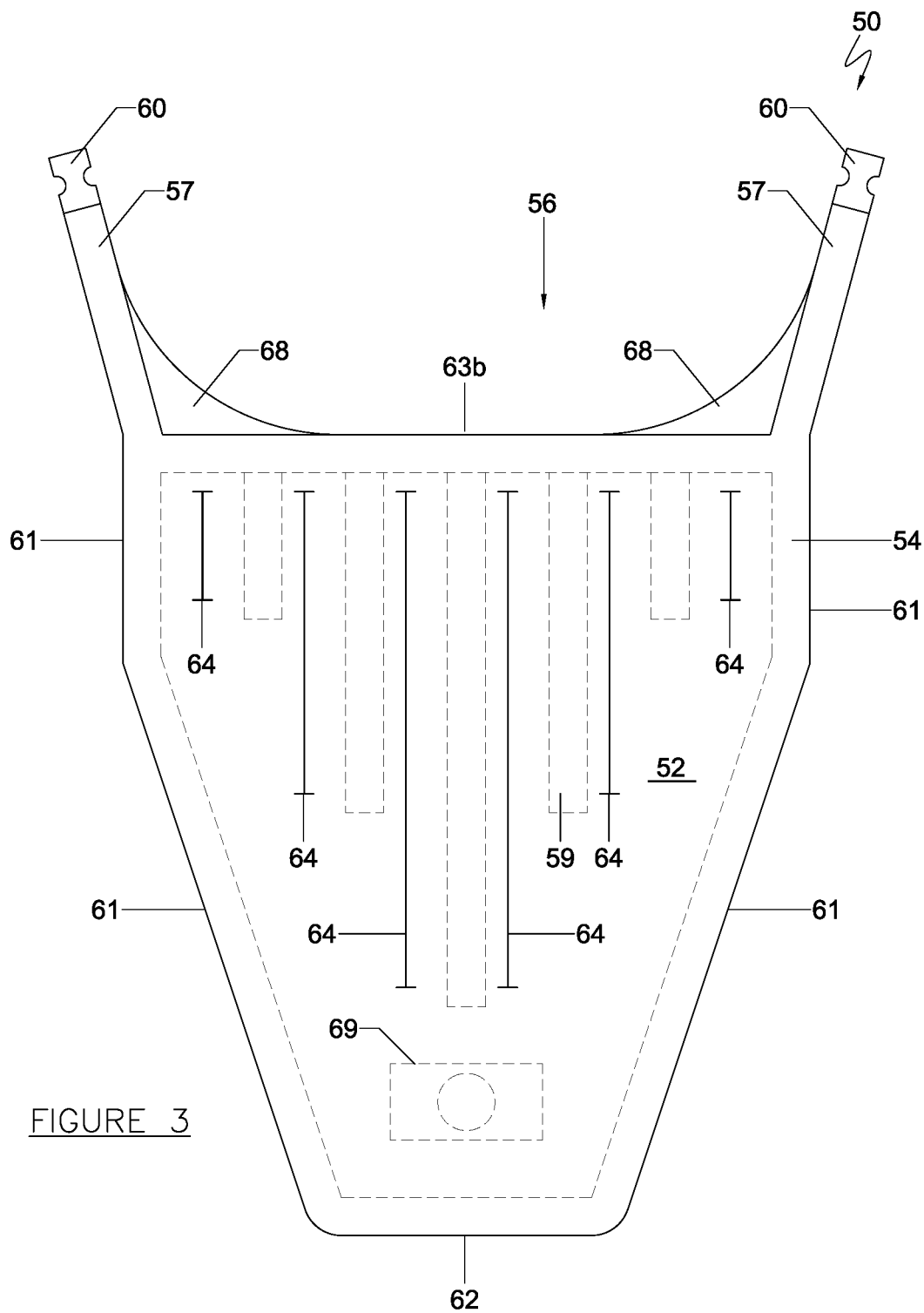
FIG. 3 is a bottom elevation view of the skimming device illustrated in FIG. 2.

The one or more float members 54 may include one or more sealed air channels. For example, as shown in FIGS. 2 and 3, an air channel inlet 57 is in fluid communication with an exterior air channel 58 extending along the entire perimeter of the skimming device 50, and is also in fluid communication with a series of interior air channels 59 extending through the centre of the upper portion 51 of skimming device 50 and disposed in between the upper portion 51 and the lower portion 52 when inflated. It will be understood by a person skilled in the art that the placement of the exterior air channel 58 and interior air channels 59, as illustrated in FIGS. 2 and 3, is not intended to be limiting and that other configurations may be possible, such as having one inlet 57 or more than two inlets 57, and having various exterior and interior air channels 58 and 59 being in fluid communication with the one or more inlets 57. Additionally, this disclosure is not intended to be limiting to any particular number or configuration of float members 54, and that any configuration and number of float members 54 on the skimming device 50 which provides sufficient buoyancy so as to cause the upper portion 51 to be substantially above the water surface and the lower portion 52 to be substantially below the water surface when the device 50 is deployed in a body of water are intended to be included within the scope of the present disclosure.

During operation, the device 50 is deployed in a body of water where there is a contaminant floating on the water's surface 70. The device 50 is deployed by attaching an air hose to the hose coupling 60 of the air channel inlet 57, thereby providing a source of air to inflate the plurality of exterior and interior air channels 58, 59. Once the device 50 is inflated and placed in a body of water, another air hose or a tether may be attached to the second air channel inlet 57 so as to provide two tethers between the operator of the skimming device 50 and the device 50 during use. The device 50 will orient itself so as to be parallel to the direction of the flow of the water, shown for example in FIG. 2 as direction W. Once inflated, preferably the upper portion 51 is held slightly above the water surface while the lower portion 52 is substantially submerged below the water surface 70, as may be seen for example in FIG. 5. A plurality of straps or other suitable tethers 53 couple the upper portion 51 to the lower portion 52, so as to prevent an excessive amount of air from entering the mouth 56 and destabilizing the device 50, while at the same time maintaining the mouth 56 substantially open to receive the flowing water. The skimming device, in some embodiments of the present disclosure, also includes an apron 68, which is some embodiments is a piece of cloth or other fabric like material, such as the polyvinyl material that the rest of the skimming device 50 is constructed of, which extends from each air channel inlet 57 to the lip 63a of upper portion 51. The purpose of the apron 68 is to prevent deflection of the air channel inlet 57 in direction D due to wind and/or the flow of the surrounding water coming into contact with the device 50 when it is deployed on a body of water, as deflecting the air channel inlet 57 in direction D may inhibit the airflow through inlet channel 57.

Preferably, the air flowing into the mouth 56 of the skimming device 50 maintains an air gap 65 between the upper portion 51 of the device and the surface 70 of the contaminated water, advantageously maintaining the upper lip 63a of the mouth above the surface of the water so as to ensure that contaminated water does not flow over the upper portion 51 and therefore bypass the skimming device, and also reducing the amount of contaminants that may otherwise adhere to the upper portion 51 of the device 50 should the upper portion 51 come into contact with the contaminated water surface 70. Optionally, skimming device 50 may include an airflow directing nozzle 69, which is coupled at one end to the outlet pipe 72 extending through the upper portion 51, with the other end of the nozzle 69 having an elongate opening oriented substantially parallel to and adjacent to the water surface 70. The outlet pipe 72 may be adjusted to extend further into air gap 65 so as to position nozzle 69 adjacent the water surface 70. The nozzle 69 advantageously directs the suctioning of the vacuum hose 74 towards the surface of the water 70 to thereby capture the contaminants on the water surface 70 without suctioning much of the heavier, uncontaminated water sitting beneath the water surface 70. Consequently, the opening into the nozzle 69 may be oriented toward the mouth 56, or oppositely, or directly downwardly towards the water surface 70, or laterally horizontally, or otherwise such that the floating contaminants on water surface 70 are suctioned through the opening of nozzle 69.

Figure 4:
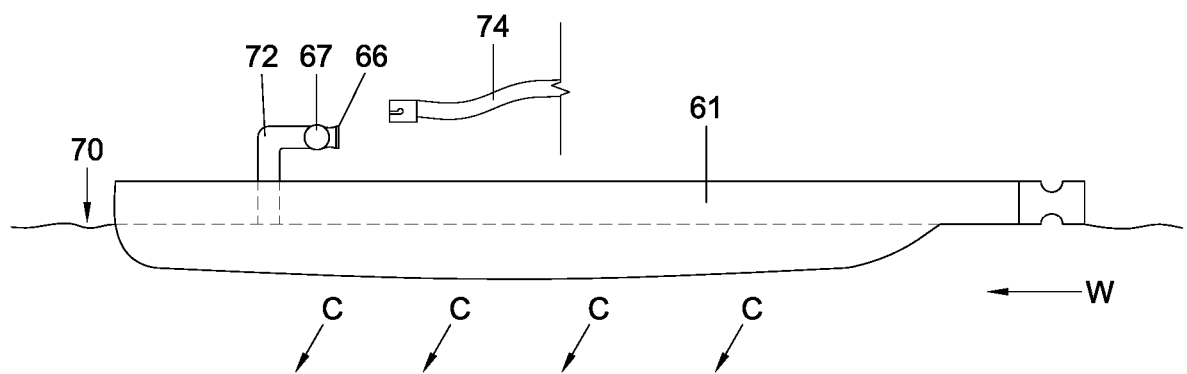
FIG. 4 is a side elevation view of the skimming device illustrated in FIG. 2.
Figure 5:
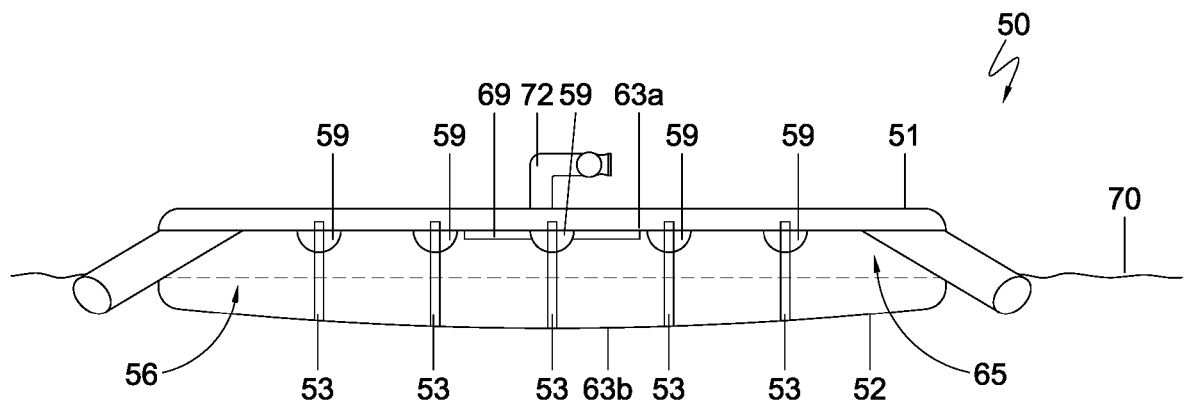
FIG. 5 is a front elevation view of the skimming device illustrated in FIG. 2.

As water flows in direction W into mouth 56, the water flows towards the nose section 55 of the device 50 where the lighter-than-water contaminants floating on the water surface 70 encounter the interior surfaces of the device 50 within the nose section 55. As may be best seen in FIGS. 3 and 4, on the lower portion 52 of the device 50 there are a series of slits 64 through which the heavier, excess water that is substantially free of contaminants flows out of the device 50 in direction C as best seen in FIG. 4.

Advantageously, the device 50 is positioned in the water in such a way so as to ensure there is an air gap 65 between the surface of the water 70 and the upper portion 51 of the device, which ensures that the continual flow of water into the mouth 56 of the device is not impeded by the upper portion 51 coming into contact with the water surface 70, and furthermore, the flow of the lighter-than-water contaminants floating on the surface 70 of the water are not impeded in their travel in direction W from the mouth 56 to the nose section 55 of the device by coming into contact with, and adhering to, upper portion 51. Overall, design of the device to maintain the appropriate amount of buoyancy such that the air gap 65 is formed between the surface 70 and the upper portion 51 may provide for more efficient collection of the lighter-than-water hydrocarbons being collected in the nose section 55, which contaminants will then be suctioned out of the nose section 55 by connecting a vacuum hose 74 to a vacuum spill apparatus 10, via the vacuum hose coupling 66. In the event the vacuum spill apparatus ceases to operate, for example due to a malfunction, the check valve 67 prevents contaminants from flowing out of vacuum hose 74 back into the skimming device 50. Alternatively, for deployment of the device 50 in a still body of water, the device 50 may be attached to a boat or other water craft and towed through the body of water so as to provide a continuous flow of the water and contaminants into the mouth 56 of the device.

What is claimed is:

1. A portable spill vacuum apparatus for collecting fluids, comprising:
   a container having a cavity and a fluid inlet, the cavity having upper and lower portions, the lower portion of the cavity including a fluid outlet biased closed by a check valve, the upper portion of the cavity including a vacuum port and a fluid-level actuated release valve,
   the release valve cooperating with the upper portion of the cavity to seal the cavity from a surrounding atmosphere until the release valve is actuated by a high fluid level reached within the lower portion of the cavity by a set volume of fluid,
   wherein coupling a vacuum source to the vacuum port depressurizes the cavity when the release and check valves are closed, and
   wherein when the set volume of fluid is received in the lower portion of the cavity through the fluid inlet so as to reach the high fluid level, the release valve is actuated so as to unseal the cavity to the atmosphere, thereby releasing the weight of the set volume of fluid to actuate the check valve of the fluid outlet and release the set volume of fluid through the fluid outlet, thereby removing the fluid from the high fluid level and resetting the release valve to a closed position.

2. The apparatus of claim 1, further comprising a float translatably mounted within and between the upper and lower portions of the cavity, the float coupled to the release valve,
   wherein when the set volume of fluid is received in the lower portion of the cavity, the float rises to actuate the release valve so as to unseal the upper portion of the cavity to the atmosphere, and the release valve resets to a closed position when the set volume of fluid is released from the cavity.

3. The apparatus of claim 1, wherein the fluid outlet is oriented towards the ground and the vacuum port is positioned above the fluid inlet when the apparatus is in use.

4. The apparatus of claim 1, wherein at least one attachment member is mounted to the container proximate the fluid outlet, the at least one attachment member adapted for releasably attaching a fluid receptacle to the container, wherein an opening of the fluid receptacle is in fluid communication with the fluid outlet of the apparatus.

5. The apparatus of claim 1, the container further comprising an opening selectively closed by a sealable cover, wherein debris received in the cavity may be removed from the cavity through the opening.

6. The apparatus of claim 1, wherein the check valve further includes a flap and a biasing means for selectively closing the flap.

7. The apparatus of claim 6, wherein the biasing means is selected from a group comprising: one or more weights mounted to the flap, one or more springs.

8. The method of using the apparatus of claim 1, the method comprising the steps of:

closing the release valve and the check valve so as to seal the upper portion of the cavity and the fluid outlet from the atmosphere, positioning a fluid receptacle proximate the fluid outlet, coupling a vacuum source to the vacuum port so as to depressurize the cavity of the container, coupling a first end of a hose to the fluid inlet and positioning a second end of the hose to contact a fluid so as to suction the fluid through the hose and the fluid inlet into the cavity, wherein when the fluid received in the cavity is substantially equal to the set volume of fluid, the release valve is actuated by the set volume of fluid so as to unseal the cavity to the atmosphere and pressurize the cavity, releasing the weight of the set volume of fluid to actuate the check valve and release the set volume of fluid from the lower portion of the cavity through the fluid outlet and into the fluid receptacle.

9. The method of claim 8, further including the steps of:

sealing the fluid receptacle when the fluid receptacle is filled with the fluid, replacing the sealed fluid receptacle with an empty fluid receptacle, the empty fluid receptacle positioned proximate the fluid outlet.

10. A portable skimming device for skimming at least one contaminant from a water surface of a body of water, wherein the body of water flows relative to a position of the skimming device or the skimming device is moved through the body of water, the at least one contaminant having a density less than a density of water in the body of water, the device comprising:

a body having upper and lower portions, the upper portion substantially above the water surface when the device is deployed in the body of water, the upper and lower portions each having coupled edges and a free edge, the coupled edges of the upper and lower portions coupled to each other and the free edges of the upper and lower portions forming an opening into a cavity of the body, the body further including one or more floats so as to buoy the body of the device in the body of water, the lower portion further including one or more longitudinal slits, the one or more longitudinal slits oriented substantially perpendicular to the opening, the upper portion including a fitting adapted for coupling a hose, the fitting in fluid communication with the water surface inside the cavity when the device is deployed in the body of water, wherein uncontaminated water flows out of the cavity through the one or more longitudinal slits as water and the at least one contaminant flows through the opening, and wherein when a vacuum apparatus is coupled to the fitting, the at least one contaminant is removed from the water surface inside the cavity through the fitting and the hose.

11. The device of claim 10, wherein the vacuum apparatus is the spill vacuum apparatus of claim 1.

12. The device of claim 10, the body further including an enclosed nose portion of the cavity, the nose portion located opposite the opening, wherein the at least one contaminant flows into the opening and collects in the nose portion when the opening is oriented along a flow direction of the body of water, and wherein the fitting extends into the cavity proximate the nose portion.

13. The device of claim 10, wherein the free edge of the lower portion is spaced apart from and anchored to the free edge of the upper portion by one or more straps.

14. The device of claim 10, wherein the one or more floats include at least one air channel.

15. The device of claim 14, wherein the at least one air channel is coextensive with the coupled edges of the upper and lower portions of the body.

16. The device of claim 15, wherein the at least one air channel includes one or more central air channels positioned between at least a portion of the coupled edges.

17. The device of claim 14, wherein the at least one air channel includes at least one inlet air tube in fluid communication with the at least one air channel, the at least one inlet air tube adapted to couple with an air source for inflating the at least one air channel.

18. The device of claim 17, wherein the at least one inlet air tube includes two inlet air tubes, each tube of the two inlet air tubes projecting along a plane of the water surface away from the body and the opening of the device, each tube of the two inlet air tubes being coextensive with at least a portion of the at least one air channel.

19. The device of claim 10, wherein the fitting includes a pipe coupled to a check valve and a nozzle, the nozzle having an opening positioned so as to contact the water surface when the device is deployed in a body of water, the check valve adapted so as to check the flow of fluid from the hose into the cavity of the device.

* * * * *